(12) United States Patent
Krieg

(10) Patent No.: US 6,302,550 B1
(45) Date of Patent: Oct. 16, 2001

(54) REAR MOUNTED MIRROR ASSEMBLY FOR MOTOR VEHICLES

(76) Inventor: Charles Krieg, 124 Roxbury Rd., Garden City, NY (US) 11530

( * ) Notice: Subject to any disclaimer, the term of this patent is extended or adjusted under 35 U.S.C. 154(b) by 0 days.

(21) Appl. No.: 09/844,597

(22) Filed: Apr. 27, 2001

(51) Int. Cl.$^7$ .................................................. G02B 7/182
(52) U.S. Cl. .................... 359/879; 359/838; 359/880; 359/881; 359/882; 359/871
(58) Field of Search ..................... 359/879, 838, 359/880, 881, 882, 871, 872

(56) References Cited

U.S. PATENT DOCUMENTS

| | | | |
|---|---|---|---|
| 4,119,107 | * 10/1978 | Pinzone et al. | ..................... 132/79 G |
| 5,359,461 | * 10/1994 | Rice et al. | ............................ 359/874 |
| 5,576,900 | * 11/1996 | Baumler et al. | ..................... 359/872 |
| 6,252,730 | * 6/2001 | Chabot | ................................. 359/880 |

* cited by examiner

Primary Examiner—Mohammad Sikder
(74) Attorney, Agent, or Firm—Goldstein Law Offices, P.C

(57) ABSTRACT

A rear mounted mirror assembly for motor vehicles including a base member coupled with respect to a rear of a motor vehicle. The base member includes a first plate and a second plate. The first plate and the second plate each have opposed upper and lower edges and opposed inner and outer edges. The first plate is fixedly secured to the rear of the motor vehicle. The inner edges of the first and second plate are joined by a hinge whereby the second plate is foldable between a first position essentially in a coplanar relationship with the first plate and a second position essentially perpendicular to the first plate. A telescoping rod is secured to the base member. A convex mirror is secured to an upper end of the telescoping rod.

4 Claims, 2 Drawing Sheets

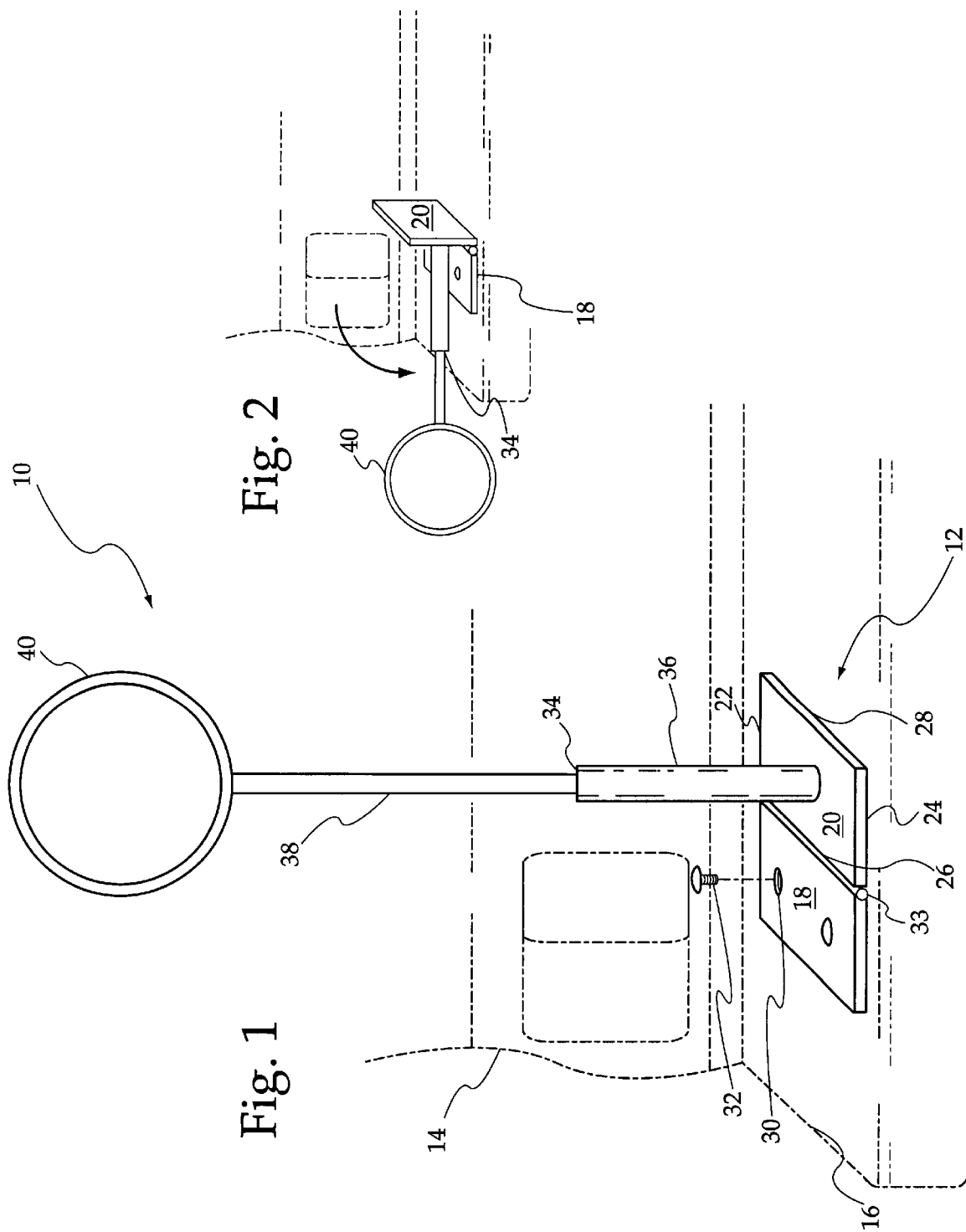

REAR MOUNTED MIRROR ASSEMBLY FOR MOTOR VEHICLES

BACKGROUND OF THE INVENTION

The present invention relates to a rear mounted mirror assembly for motor vehicles and more particularly pertains to allowing a driver to see other vehicles and obstructions when backing out of a parking spot.

The use of vehicle mirror devices is known in the prior art. More specifically, vehicle mirror devices heretofore devised and utilized for the purpose of aiding the vision of drivers are known to consist basically of familiar, expected and obvious structural configurations, notwithstanding the myriad of designs encompassed by the crowded prior art that have been developed for the fulfillment of countless objectives and requirements.

By way of example, U.S. Pat. No. 6,079,837 to Singleton discloses a rear mountable mirror attachable to a vehicle, for assisting in hitching a trailer. U.S. Pat. Nos. 5,489,080 to Allen and 4,664,489 to Karns disclose an auxiliary mirror devices for use with vehicles.

While these devices fulfill their respective, particular objective and requirements, the aforementioned patents do not describe a rear mounted mirror assembly for motor vehicles for allowing a driver to see other vehicles and obstructions when backing out of a parking spot.

In this respect, the rear mounted mirror assembly for motor vehicles according to the present invention substantially departs from the conventional concepts and designs of the prior art, and in doing so provides an apparatus primarily developed for the purpose of allowing a driver to see other vehicles and obstructions when backing out of a parking spot.

Therefore, it can be appreciated that there exists a continuing need for a new and improved rear mounted mirror assembly for motor vehicles that can be used for allowing a driver to see other vehicles and obstructions when backing out of a parking spot. In this regard, the present invention substantially fulfills this need.

SUMMARY OF THE INVENTION

In the view of the foregoing disadvantages inherent in the known types of vehicle mirror devices now present in the prior art, the present invention provides an improved rear mounted mirror assembly for motor vehicles. As such, the general purpose of the present invention, which will be described subsequently in greater detail, is to provide a new and improved rear mounted mirror assembly for motor vehicles that has all the advantages of the prior art and none of the disadvantages.

To attain this, the present invention essentially comprises a base member coupled with respect to a rear of a motor vehicle. The base member includes a first plate and a second plate. The first plate and the second plate each have opposed upper and lower edges and opposed inner and outer edges. The first plate is fixedly secured to the rear of the motor vehicle. The inner edges of the first and second plate are joined by a hinge whereby the second plate is foldable between a first position essentially in a coplanar relationship with the first plate and a second position essentially perpendicular to the first plate. A telescoping rod is secured to the base member. The telescoping rod includes a lower portion and an upper portion. The lower portion has an open upper end for slidably and rotatably receiving the upper portion therein. The lower portion has a lower end fixedly secured to the second plate of the base member. A convex mirror is secured to an upper end of the upper portion.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved rear mounted mirror assembly for motor vehicles that has all the advantages of the prior art vehicle mirror devices and none of the disadvantages.

It is another object of the present invention to provide a new and improved rear mounted mirror assembly for motor vehicles that may be easily and efficiently manufactured and marketed.

It is a further object of the present invention to provide a new and improved rear mounted mirror assembly for motor vehicles that is of durable and reliable construction.

An even further object of the present invention is to provide a new and improved rear mounted mirror assembly for motor vehicles that is susceptible of a low cost of manufacture with regard to both materials and labor, and which accordingly is then susceptible of low prices of sale to the consuming public, thereby making such a rear mounted mirror assembly for motor vehicles economically available to the buying public.

Even still another object of the present invention is to provide a new and improved rear mounted mirror assembly for motor vehicles for allowing a driver to see other vehicles and obstructions when backing out of a parking spot.

Lastly, it is an object of the present invention to provide a new and improved rear mounted mirror assembly for motor vehicles including a base member coupled with respect to a rear of a motor vehicle. The base member includes a first plate and a second plate. The first plate and the second plate each have opposed upper and lower edges and opposed inner and outer edges. The first plate is fixedly secured to the rear of the motor vehicle. The inner edges of the first and second plate are joined by a hinge whereby the second plate is foldable between a first position essentially in a coplanar relationship with the first plate and a second position essentially perpendicular to the first plate. A telescoping rod is secured to the base member. A convex mirror is secured to an upper end of the telescoping rod.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the rear mounted mirror assembly for motor vehicles constructed in accordance with the principles of the present invention.

FIGS. 2–4 are perspective views of the present invention illustrated a lowered orientation.

The same reference numerals refer to the same parts through the various figures.

DESCRIPTION OF THE PREFERRED EMBODIMENT

With reference now to the drawings, and in particular, to figures one through four thereof, the preferred embodiment of the new and improved rear mounted mirror assembly for motor vehicles embodying the principles and concepts of the present invention and generally designated by the reference number 10 will be described.

Specifically, it will be noted in the various figures that the device relates to a rear mounted mirror assembly for motor vehicles for allowing a driver to see other vehicles and obstructions when backing out of a parking spot. In its broadest context, the device consists of a base member, a telescoping rod, and a convex mirror. Such components are individually configured and correlated with respect to each other so as to attain the desired objective.

Figure 3:
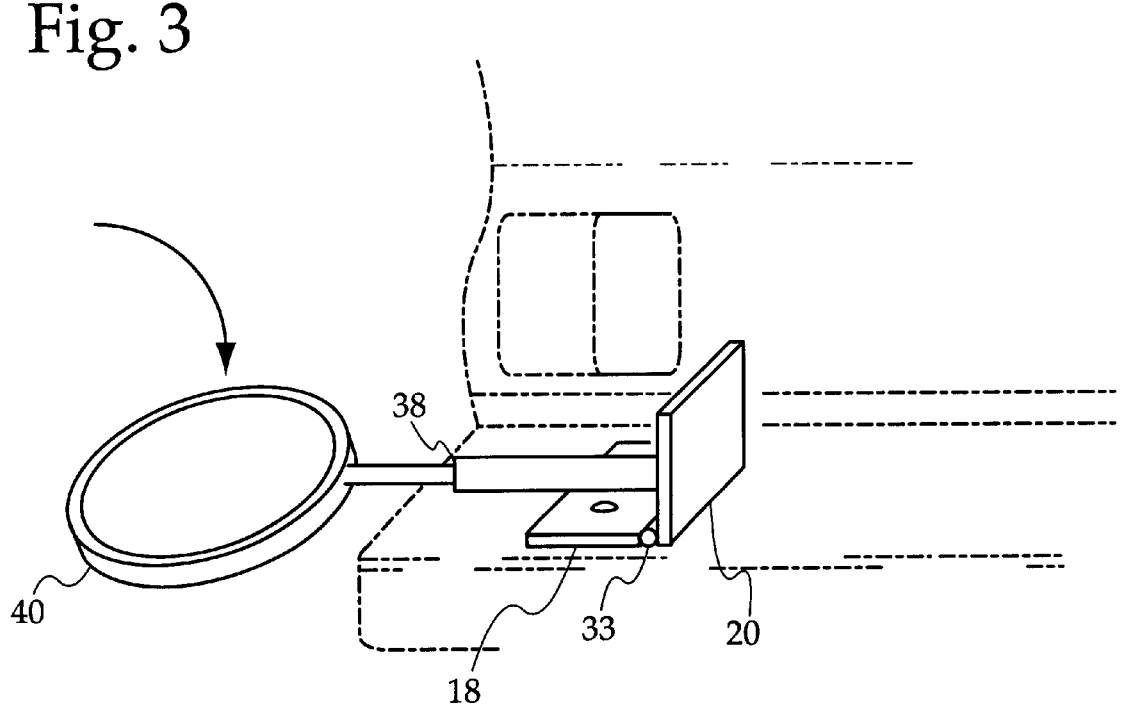
Figure 4:
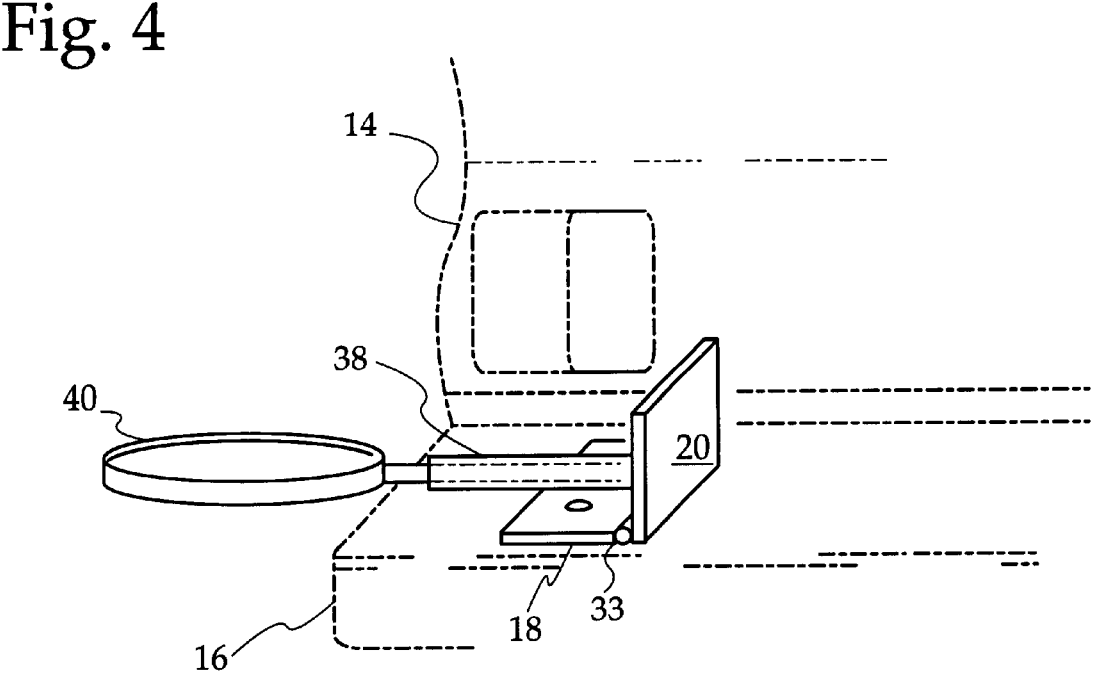

The base member 12 is coupled with respect to a rear of a motor vehicle 14. In the preferred embodiment, the base member 12 is secured to a rear bumper 16 of the motor vehicle 14. Alternately, the base member 12 could be secured to a trunk lid of the motor vehicle 14. The base member 12 includes a first plate 18 and a second plate 20. The first plate 18 and the second plate 20 each have opposed upper and lower edges 22,24 and opposed inner and outer edges 26,28. The first plate 18 is fixedly secured to the rear of the motor vehicle 14. The first plate 18 is provided with a pair of apertures 30 therethrough to receive screws 32 for securement to the motor vehicle 14. Note FIG. 1. The inner edges 28 of the first and second plate 18,20 are joined by a hinge 33 whereby the second plate 20 is foldable between a first position essentially in a coplanar relationship with the first plate 18 (see FIG. 1) and a second position essentially perpendicular to the first plate 18 (see FIGS. 2–4).

The telescoping rod 34 is secured to the base member 12. The telescoping rod 34 includes a lower portion 36 and an upper portion 38. The lower portion 36 has an open upper end for slidably and rotatably receiving the upper portion 38 therein. The lower portion 36 has a lower end fixedly secured to the second plate 20 of the base member 12. The lower portion 36 can slide in and out of the upper portion 38 to a variety of heights and can also rotate within the upper portion 38 to a variety of angles. Note FIGS. 3 and 4.

The convex mirror 40 is secured to an upper end of the upper portion 38 of the telescoping rod 34. The convex mirror 40, through the adjustment of the telescoping rod 34, can be adjusted to allow the driver to see oncoming vehicles and pedestrians when backing out of a parking space. Sometimes a driver's view is obstructed by a larger vehicle or truck that is parked next to their vehicle. This necessitates the use of the present invention to avoid accidents.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the united states is as follows:

1. A rear mounted mirror assembly for motor vehicles for allowing a driver to see other vehicles and obstructions when backing out of a parking spot comprising, in combination:

a base member coupled to a rear bumper of a motor vehicle, the base member including a first plate and a second plate, the first plate and the second plate each having opposed upper and lower edges and opposed inner and outer edges, the first plate being fixedly secured to the rear bumper of the motor vehicle, the inner edges of the first and second plate being joined by a hinge wherein the second plate is foldable between a first position essentially in a coplanar relationship with the first plate and a second position essentially perpendicular to the first plate;

a telescoping rod secured to the base member, the telescoping rod including a lower portion and an upper portion, the lower portion having an open upper end for slidably and rotatably receiving the upper portion therein, the lower portion having a lower end fixedly secured to the second plate of the base member; and a convex mirror secured to an upper end of the upper portion of the telescoping rod.

2. A rear mounted mirror assembly for motor vehicles for allowing a driver to see other vehicles and obstructions when backing out of a parking spot comprising, in combination:

a base member coupled to one of a rear bumper or a trunk lid of a motor vehicle, the base member including a first plate and a second plate, the first plate and the second plate each having opposed upper and lower edges and opposed inner and outer edges, the first plate being fixedly secured to the rear of said one of a rear bumper or a trunk lid of the motor vehicle, the inner edges of the first and second plate being joined by a hinge wherein the second plate is foldable between a first position essentially in a coplanar relationship with the first plate and a second position essentially perpendicular to the first plate;

a telescoping rod secured to the base member; the telescoping rod including a lower portion and an upper portion, the lower portion having an open upper end for slidably and rotatably receiving the upper portion therein, the lower portion having a lower end fixedly secured to the second plate of the base member; and a convex mirror secured to an upper end of the upper portion of the telescoping rod.

3. The rear mounted mirror assembly for motor vehicles as set forth in claim 2, wherein the base member is secured to a rear bumper of the motor vehicle.

4. The rear mounted mirror assembly for motor vehicles as set forth in claim 2, wherein the base member is secured to a trunk lid of the motor vehicle.

* * * * *